March 27, 1945.  E. W. McNEALY  2,372,441
METHOD OF ACID TREATING
Filed Oct. 23, 1942
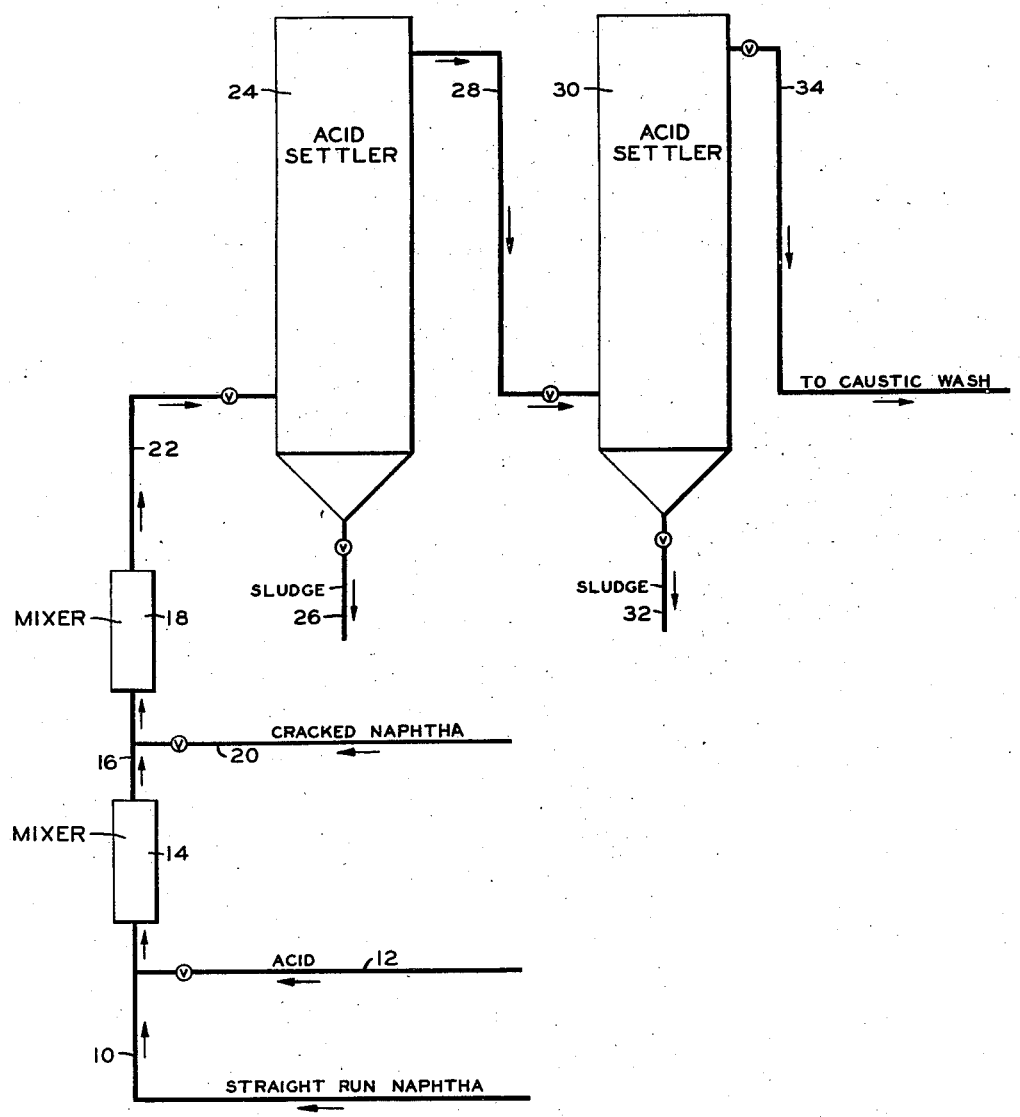
EDDINS W. MCNEALY
INVENTOR
BY R. J. Dearborn
Daniel Stryker
HIS ATTORNEY Patented Mar. 27, 1945

2,372,441

UNITED STATES PATENT OFFICE 2,372,441

METHOD OF ACID TREATING

Eddins W. McNealy, Long Beach, Calif., assignor to The Texas Company, New York, N. Y., a corporation of Delaware Application October 23, 1942, Serial No. 463,045

5 Claims. (Cl. 196—40)

This invention relates to a process of acid treating petroleum hydrocarbon oils. The invention particularly relates to a process of treating both straight run and cracked petroleum hydrocarbon oils with sulfuric acid to remove sulfur and gum forming constituents therefrom.

In United States Patent 2,296,096 to R. F. Dorsch a process of acid treating both straight run and cracked petroleum hydrocarbon oils is described. The process comprises introducing all the acid required for the treatment of both oils into the straight run oil, and then using the acid sludge from the straight run treatment for the treatment of the cracked oil. The process has several important advantages pointed out in the patent, including the advantageous severe acid treatment of the straight run oil, a reduction in the total amount of acid used, and simplified control of the operation because only one stream of acid is introduced into the system and the acid requirements may be determined by reference to the requirements of the cracked oil.

The specific method for carrying out the process which is disclosed in the above patent comprises mixing the acid with the straight run oil, subjecting the resulting product to settling to settle out the straight run sludge, and then mixing the straight run sludge with the cracked oil. The mixture of cracked oil and straight run sludge is mixed thoroughly and then may be settled to remove the final sludge, or the mixture may be combined with the acid treated straight run oil and passed to a settler from which the final sludge is removed.

The present invention is primarily concerned with another method of carrying out the process described and claimed in this patent, although the invention has application to other processes. While the present method as preferably practiced embodies the important advantages of the specific method disclosed in the patent, it accomplishes the results in a different way. As appears from the following description, the present method may be carried out with different equipment and involves certain other advantages over the method specifically disclosed in the patent.

In accordance with the present invention, the straight run petroleum hydrocarbon oil is mixed with the acid, which is usually a recovered sulfuric acid or other sulfuric acid which has been employed in a treatment requiring the use of relatively pure sulfuric acid, and the resulting mixture is agitated to accomplish at least the major portion of the acid treating of the straight run oil. Then, without separating the straight run sludge from the oil, the mixture of acid treated straight run oil and acid sludge is combined with the cracked oil. This mixture of oil and sludge is agitated to accomplish acid treating of the cracked oil and the product obtained is settled to remove the final sludge as in the prior process. The treated oils are then passed to a caustic wash and are further treated to obtain a finished product.

It will be noted that in accordance with the present method, the step of settling the straight run acid sludge from the straight run oil has been eliminated and the time elapsing between the formation of the straight run acid sludge and the use of this sludge for the treatment of cracked naphtha has been reduced. Thus, the present method requires one less settling step and the possibility of decomposition of the straight run sludge has been avoided. It is pointed out that in the usual operation the sludge produced as a result of the treatment of the straight run naphtha is not a stable product. Reaction between the acid and the organic constituents of the sludge takes place on standing, resulting in the loss of acid and the formation of impurities which have to be removed by later treatment.

Also, the reaction between the cracked oil and the straight run sludge is accomplished in the presence of the straight run oil, which results in reducing the temperature rise on the cracked oil, thereby minimizing the losses due to polymerization.

In order that the invention may be understood more fully, reference should be had to the drawing, the single figure of which represents diagrammatically a suitable system for carrying out the present method. The method will be described in connection with the acid treatment of a straight run and cracked naphtha.

Referring to the drawing, the straight run naphtha is introduced into the system through a line 10 and while flowing in this line is contacted with acid introduced through valved line 12. The mixture of acid and straight run naphtha then passes into a mixer 14, which may be of any conventional type; for example, it may consist of one or more pipe mixers. In this mixer, the reaction between the straight run naphtha and the acid is substantially completed. The mixture of straight run naphtha and the sludge formed in the reaction then passes into line 16 leading to a mixer 18. While flowing in line 16 there is added to the mixture of straight run naphtha and sludge through valved line 20 the cracked naphtha to be treated in the process. The combined oils and the sludge are then mixed thoroughly in mixer 18 to accomplish the acid treating of the cracked naphtha and the resulting mixture is passed through valved line 22 leading to an acid settler 24. In this settler the initial settling of the sludge is accomplished and the separated sludge is removed through valved line 26. The mixed oils, still containing a quantity of sludge, are passed from the upper portion of the settler and through valved line 28 leading to a second settler 30. In this settler the remainder of the sludge is settled out of the mixed oils and may be removed through valved line 32. The acid treated oils are removed from the system through valved line 34 and are passed to a caustic washing system, and to any further treatment desired.

When operating in the manner described various types of sulfuric acid treating agents may be employed, as indicated previously. As examples of such treating agents, all of which are referred to as sulfuric acid in the art, there may be mentioned relatively pure strong sulfuric acid, recovered 98 per cent black acid and used sulfuric acid obtained from an alkylation process.

The method is best carried out by using relatively short times of contact between the oils and the acid materials and assuring that rapid and intimate mixing is accomplished. It is undesirable to substitute a long time of contact for intimacy of mixing in the reaction between the straight run naphtha and the acid because it appears that the sludge which is formed tends to become decomposed and may release a portion of the sulfur. Generally, more extended mixing of the combined oils and straight run sludge is required than in the case of the acid treatment of the straight run oil because of the greater quantity of oil required to be handled. In this case, also, however, a relatively short time of contact and intimate mixing are desirable to avoid over-reaction of the cracked oil which results in losses due to polymerization.

When all of the acid used in the process is introduced into the straight run oil, the amount of acid required is of course determined by reference to the characteristics of the mixed oils. However, because all of the acid comes into contact with the straight run oil, which is therefore severely treated, more severely than would be the case were the straight run oil to be treated separately, this means essentially that the acid requirements are determined by reference to the characteristics of the treated cracked oil.

Although the invention is especially important when the method is employed in a process in which all of the acid used is employed for the treatment of the straight run oil, the method may also be used with advantage in cases where additional acid is under for the treatment of the cracked or mixed oils. In this case the additional acid may be added at any desired point in the process.

The present method may be carried out for the treating of about 32 barrels per hour of straight run naphtha containing about 0.136 per cent sulfur by the lamp test, and about 96 barrels per hour of cracked naphtha containing about 0.246 per cent sulfur in the following manner. The straight run naphtha is introduced through line 10 at the rate indicated and is contacted with sulfuric acid of about 103 per cent strength through line 12 at a rate corresponding to about 12.23 pounds of acid per barrel of the straight run naphtha. The resulting mixture of oil and acid is then passed through the mixer 14, which is preferably a double pipe mixer of the Ebaugh type. The time of contact in this mixer is preferably about 5 seconds. Thereafter the cracked naphtha is introduced into the straight run oil and sludge and the combined materials are passed through mixer 18. The latter mixer may be composed of five Ebaugh mixers and the time of contact may be about 9 seconds. The treated oils and sludge are then passed to the settlers and to further handling as described above.

In the preferred embodiment of the invention, the strength of acid used and manipulative procedure employed in the initial treatment of the straight run oil should be adjusted so as to accomplish the vigorous treatment of the straight run oil and yet yield a relatively strong acid sludge. Thus, the sludge should contain at least 70 per cent and preferably above 75 per cent $H_2SO_4$. Accordingly, as above discussed, the acid requirements are determined essentially by the requirements of the cracked oil, or stated in another way, the specifications to be met by the finished mixed oil.

By proceeding as above described a treated gasoline may be obtained containing about 0.097 per cent sulfur. In this case the sulfur content of the straight run naphtha may be reduced to about 0.017 per cent and that of the total naphtha to about 0.0195 per cent. After caustic washing and steam stilling a final gasoline having the above low sulfur content may be obtained.

While in the above described process about 12.23 pounds of acid were used for each barrel of straight run oil, for the treatment of naphthas of the type in question satisfactory results can ordinarily be obtained with the use of an amount of acid equal to 9 pounds or more per barrel of straight run oil. The use of an amount in excess of 9 pounds ordinarily does not result in a corresponding decrease in the amount of sulfur in the finished oils.

Obviously many modifications and variations of the invention, as hereinbefore set forth, may be made without departing from the spirit and scope thereof, and therefore only such limtations should be imposed as are indicated in the appended claims.

I claim:

1. In a process for the acid treatment of both straight run and cracked petroleum hydrocarbon oils, the method which comprises contacting the straight run petroleum hydrocarbon oil with sulfuric acid to form a mixture of acid treated straight run petroleum hydrocarbon oil and a straight run acid sludge, mixing said mixture with the cracked petroleum hydrocarbon oil to accomplish an acid treatment of the cracked petroleum hydrocarbon oil by the straight run acid sludge and form a resulting mixture of straight run petroleum hydrocarbon oil, cracked petroleum hydrocarbon oil, and final acid sludge, and separating said final acid sludge from said oils.

2. In a process for the acid treatment of both straight run and cracked petroleum hydrocarbon oils, the method which comprises contacting the straight run petroleum hydrocarbon oil with sulfuric acid to form a mixture of acid treated straight run petroleum hydrocarbon oil and a straight run acid sludge, mixing said mixture with the cracked petroleum hydrocarbon oil to accomplish an acid treatment of the cracked petroleum hydrocarbon oil by the straight run acid sludge and form a resulting mixture of straight run petroleum hydrocarbon oil, cracked petroleum hydrocarbon oil, and final acid sludge, and separating said final acid sludge from said oils, the sulfuric acid contacted with the straight run petroleum hydrocarbon oil being the only acid employed in the process.

3. In a process for the acid treatment of both straight run and cracked naphthas, the method which comprises contacting the straight run naphtha with sulfuric acid to form a mixture of acid treated straight run naphtha and a straight run acid sludge, mixing said mixture with the cracked naphtha to accomplish an acid treatment of the cracked naphtha by the straight run acid sludge and form a resulting mixture of straight run naphtha, cracked naphtha, and final acid sludge, and separating said final acid sludge from said naphthas, the sulfuric acid contacted with the straight run naphtha being the only acid employed in the process.

4. In a process for the acid treatment of both straight run and cracked naphthas, the method which comprises contacting the straight run naphtha with sulfuric acid to form a mixture of acid treated straight run naphtha and a straight run acid sludge, mixing said mixture with the cracked naphtha to accomplish an acid treatment of the cracked naphtha by the straight run acid sludge and form a resulting mixture of straight run naphtha, cracked naphtha, and final acid sludge, and separating said final acid sludge from said naphthas, the sulfuric acid contacted with the straight run naphtha being the only acid employed in the process, and the amount of this acid being regulated in accordance with the acid requirements of the cracked naphtha.

5. In a process for the acid treatment of both straight run and cracked naphthas, the method which comprises mixing the straight run naphtha with sulfuric acid to form a mixture of acid-treated straight run naphtha and a straight run acid sludge, the quantity of sulfuric acid and the mixing being controlled to yield a straight run acid sludge of at least 70 per cent $H_2SO_4$ content, mixing said mixture with the cracked naphtha to accomplish an acid treatment of the cracked naphtha by the straight run acid sludge and form a resulting mixture of straight run naphtha, cracked naphtha, and final acid sludge, and separating said final acid sludge from said naphthas.

EDDINS W. McNEALY.

CERTIFICATE OF CORRECTION.

Patent No. 2,372,441. March 27, 1945.

EDDINS W. McNEALY.

It is hereby certified that error appears in the printed specification of the above numbered patent requiring correction as follows: Page 2, first column, line 61, for the word "under" read --used--; and that the said Letters Patent should be read with this correction therein that the same may conform to the record of the case in the Patent Office Signed and sealed this 12th day of June, A. D. 1945.

Leslie Frazer (Seal)                  Acting Commissioner of Patents.